(No Model.)
G. W. BELL.
WEATHER STRIP.
No. 308,735. Patented Dec. 2, 1884.
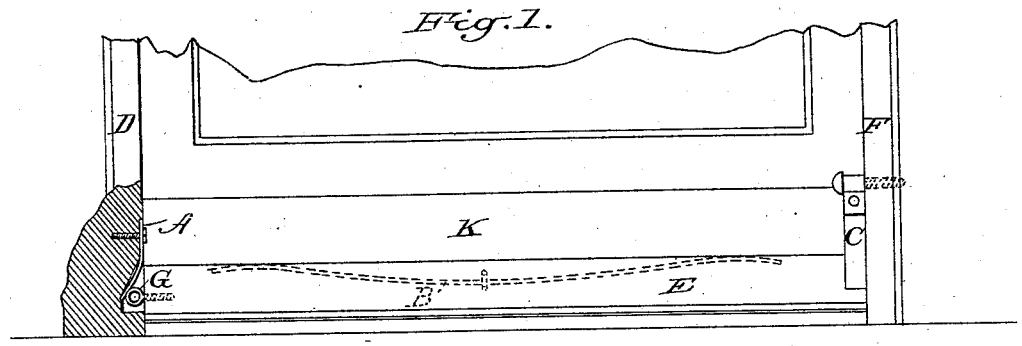
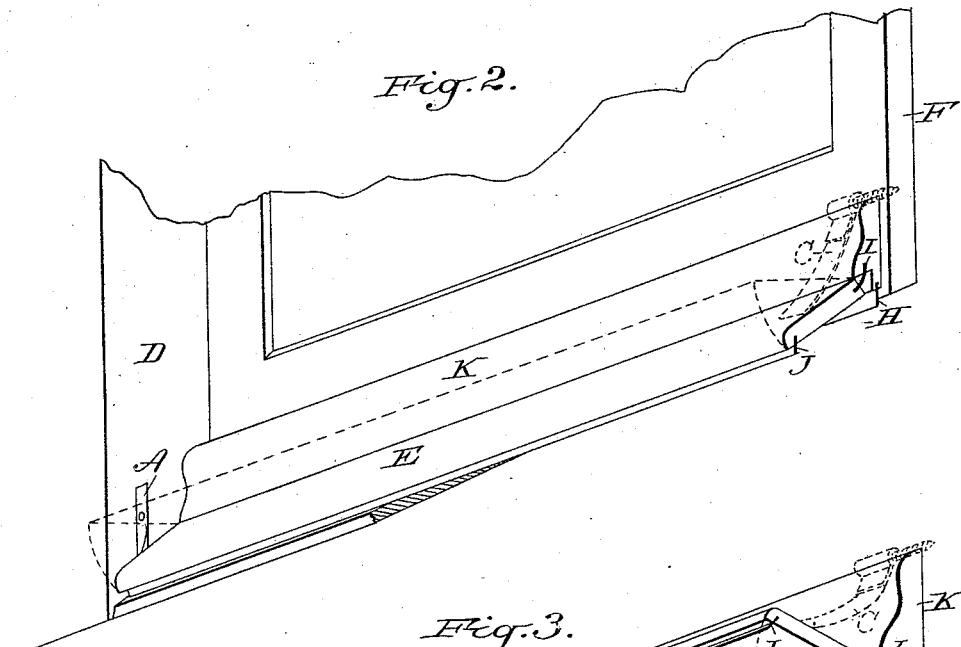
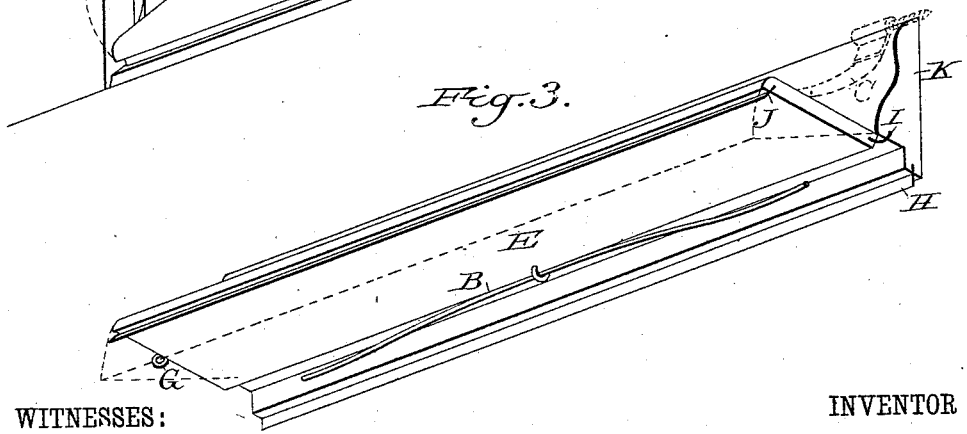
WITNESSES:
Joseph Thompson
John N. Johnson
INVENTOR
George Washington Bell

UNITED STATES PATENT OFFICE.

GEORGE W. BELL, OF ST. JOSEPH, MISSOURI.

WEATHER-STRIP.

SPECIFICATION forming part of Letters Patent No. 308,735, dated December 2, 1884.

Application filed February 12, 1884. (No model.)

*To all whom it may concern:*

Be it known that I, GEORGE W. BELL, a citizen of the United States, residing at St. Joseph, in the county of Buchanan and State of Missouri, have invented certain new and useful Improvements in Weather-Strips; and I do hereby declare that the following is a full, clear, and exact description of the same, reference being had to the annexed drawings, making a part of this specification, and to the letters and figures of reference marked thereon.

This invention has relation to weather-strips attached to the outside and bottom of doors in such manner as to shut tightly down when the door is closed, closing all space between the shut door and threshold; and the objects of my invention are to secure perfect protection against rain, snow, dust, and cold air, durability in construction, simplicity in application, and cheapness of construction. These objects are attained by the mechanism illustrated in the accompanying drawings, in which—

Figure 1 represents a front view of the weather-strip when the door is closed. Fig. 2 represents a side and end view of the weather-strip. Fig. 3 represents the bottom or under side view of the weather-strip.

Similar letters refer to similar parts in the several figures.

A is a spring or notch in jamb, hinge side of frame; B, spring on under side of weather-strip; C, spring on jamb, lock side of frame; D, jamb of frame, hinge side; E, light wooden molding or strip; F, jamb of frame, lock side; G, cam in end of molding E; H, rubber or felt strip; I, rubber or felt strip; J, rubber or felt strip; K, wooden molding attached to door.

The molding or strip E is hinged to molding K by means of rubber or felt strip I, which is glued or riveted (or both) into a saw-cut full length of molding K, front edge, and back edge of strip E, making a continuous and impervious hinge. The rubber or felt strip H is glued or riveted (or both) into a saw-cut full length of molding K on under and back edge, and when door is shut works close on top of threshold. The rubber or strip J is glued or riveted (or both) into a saw-cut full length in front edge or lip of strip E, so that when the door is shut it presses upon the sill or threshold of door. The strip or molding E is held up by the bent spring B, which is attached to under side of strip E by staple or screw eye, and its ends rest on or work on a corner-piece of metal set in the rabbet on under and front side of molding K. The spring C on lock side of frame, in conjunction with the cam G, and spring or notch A throw the strip E down and hold it securely when the door is shut. The light molding or strip E is hinged to molding K by means of rubber or felt strip I, which is glued or riveted (or both) into a saw-cut full length of front edge of molding K and back edge of strip E, making a continuous and impervious hinge. The molding K, attached to door, has inserted into its back and lower edge the flexible rubber or felt strip H, which works close on top of threshold when door is shut. The rubber or felt strip J is glued or riveted (or both) into a saw cut full length of strip E in its outer edge or lip, so when the door is shut it is pressed and held firmly down on the outer bevel of the threshold, making, in conjunction with the flexible strip H, a double strip.

What I claim as new, and desire to secure by Letters Patent, is—

In a weather-strip, the molding K, having the flexible strip in its lower edge, and the adjustable strip flexibly hinged to said molding, and having a flexible piece along its lower outer edge, in combination with actuating-springs A, B, and C, all substantially as shown and described.

GEORGE W. BELL.

Witnesses:
JOHN W. JOHNSON,
M. LAWLOR.